B. ADRIANCE & A. CALLESON.
MACHINE FOR MAKING ARTICLES OF SHEET METAL.
APPLICATION FILED DEC. 28, 1910.

1,029,334.

Patented June 11, 1912.

WITNESSES

INVENTORS,
Benjamin Adriance
and Amos Calleson,
BY

ATTORNEY.

B. ADRIANCE & A. CALLESON.
MACHINE FOR MAKING ARTICLES OF SHEET METAL.
APPLICATION FILED DEC. 28, 1910.

1,029,334.

Patented June 11, 1912.

WITNESSES

INVENTORS,
Benjamin Adriance,
and Amos Calleson,
BY

ATTORNEY.

UNITED STATES PATENT OFFICE.

BENJAMIN ADRIANCE AND AMOS CALLESON, OF BROOKLYN, NEW YORK; SAID CALLESON ASSIGNOR TO SAID ADRIANCE.

MACHINE FOR MAKING ARTICLES OF SHEET METAL.

1,029,334.      Specification of Letters Patent.      Patented June 11, 1912.

Application filed December 28, 1910. Serial No. 599,655.

*To all whom it may concern*.

Be it known that we, BENJAMIN ADRIANCE and AMOS CALLESON, citizens of the United States, residing in Brooklyn, borough of Brooklyn, and State of New York, have invented certain new and useful Improvements in Machines for Making Articles of Sheet Metal; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

Our invention relates to that class of means for operating on sheets in which the sheets or plates are advanced one by one, planiform fashion, from a stack or pile to a die or other forming means, and it consists in certain improvements in that branch of the art which is represented by our U. S. Letters Patent No. 947273 wherein is disclosed a mechanism whereby notwithstanding the existence of conditions tending to prevent the precise feeding of the sheets one by one (such as that they may vary in thickness), such feeding is accurately accomplished. In that machine, in addition to means for parting the tail of each sheet to be advanced from the adjoining sheet and means for effecting the advance, means is employed which opposes resistance to the said adjoining sheet operating to prevent it from being fed forward with the first sheet on account of adhesion of some kind or other existing between the two sheets. The said means serves eminently well where the material of the sheets is of such strength that they will not buckle or bend under the pressure thus exerted; but its adaptability for successful use is limited by the strength of the material, usually dependent upon its thickness.

One of the principal objects of the present invention is so to construct a mechanism of the kind referred to that it will operate with the desired precision and efficiency in successively selecting the sheets and feeding each sheet forward, planiform fashion, regardless of the circumstance that the sheets may be ever so much thinner or weaker than those operated upon in our patented machine.

Further objects of the invention are to improve the means for timing the operations on each sheet, for effecting the ejection of the waste from the machine and for clearing the dies.

In the accompanying drawings, Fig. 6 shows a fragment of the rack in front elevation and a strip coactive therewith in section; Fig. 7 is a detail view showing a fragment of the pile of sheets, the separating knife in section and a part of the rack and means coöperating therewith in side elevation; Fig. 27 illustrates in front elevation, partly in section, a part of the means whereby the automatic advance of each sheet is begun when its predecessor has completed its advance; and, Figs. 28, 29 and 30 illustrate means employed to prevent any possible working forward of sheets in the stack adjoining the plane of the sheet advanced.

On the base $a$ is arranged the frame $b$, which is tilted backward somewhat and is provided with a slideway $c$ for the plunger $d$ carrying the upper members $e$ of the dies (Figs. 1, 2, 24 and 25) and which is connected with the crank $f$ on the main shaft $g$ by the usual pitman $h$; through a suitable clutch (not shown) operated from the treadle $i$ power is transmitted to said shaft by means of the belt pulley $j$ revolubly arranged thereon in the usual manner.

$k$ is the table of the machine, bolted to frame $b$ and having in its main portion $l$ the holes $m$ corresponding to the lower dies $n$ (Figs. 1 and 3) and in its extension $o$ a longitudinal groove $p$, an elongated opening $q$ communicating with said groove and a recess $r$ forward of said groove. From the extension, back of the groove, depends the bearing bracket $s$.

Figure 10:
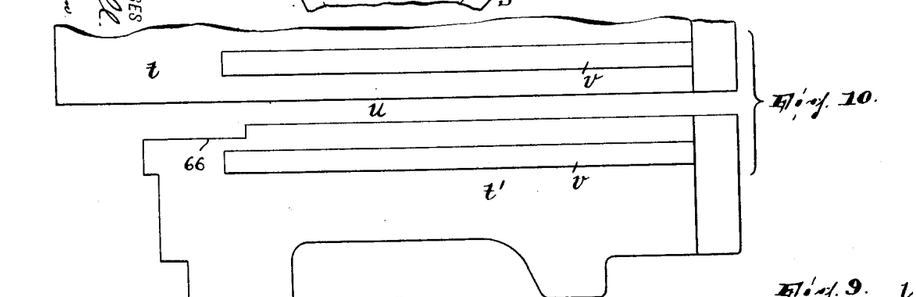
Figures 12, 13, 14, 15, 16, 17, 18, 19, 20:
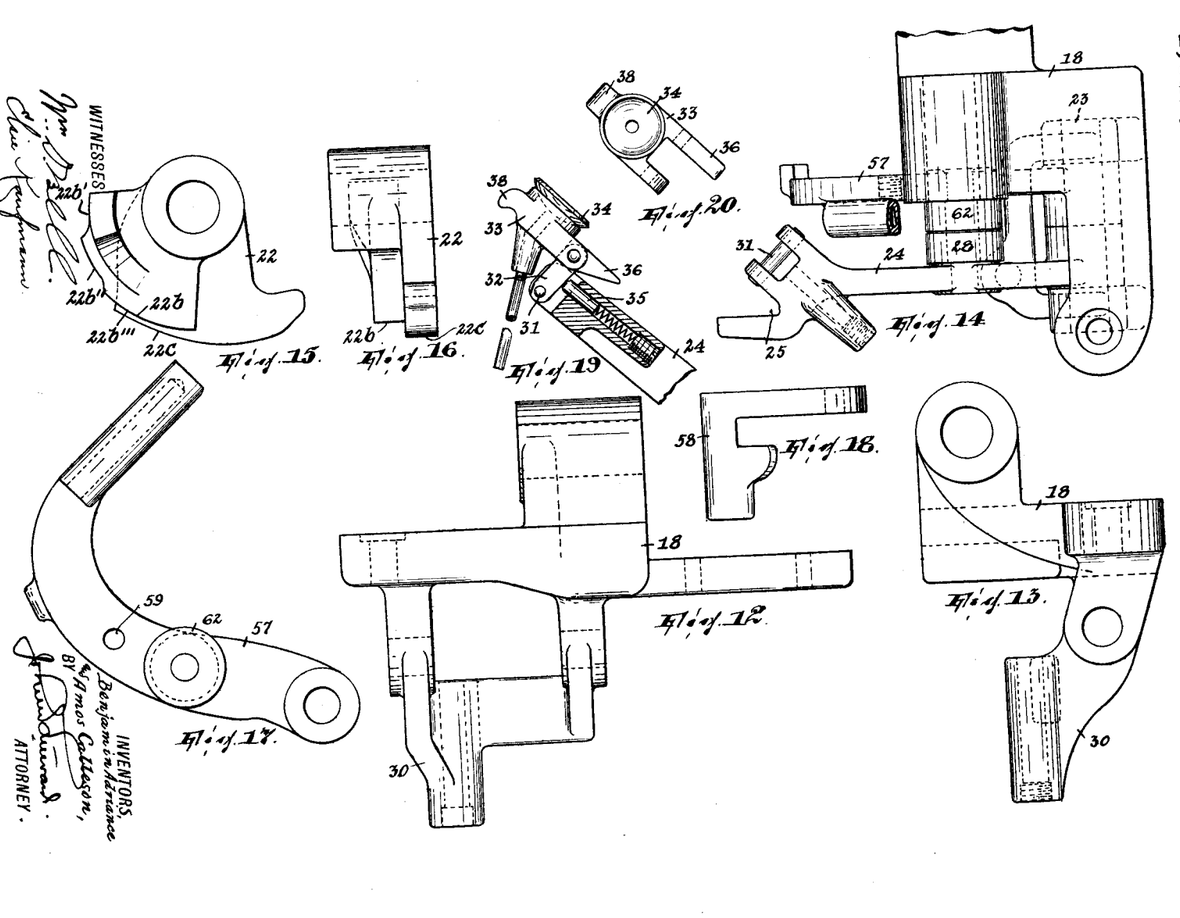
Figs. 12, 13 and 14 are a front and a side elevation and a plan of a bracket supporting parts included in the means for initially acting upon each sheet as it is about to begin its advance, Fig. 14 also showing parts of the suction device and presser included in said means.
Figs. 15 and 16 are front and right side views of a cam 22.
Figs. 17 and 18 are a front elevation and a plan view of the two parts of the suction device.
Figs. 19 and 20 are a side view, partly in section, and a plan of parts of the suction device.
Figure 22:
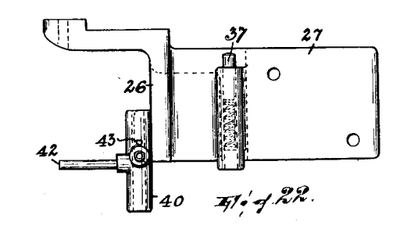
Figs. 22 and 23 are front and plan views of another bracket coöperating with the suction device and with the separating knife.
Figure 23:
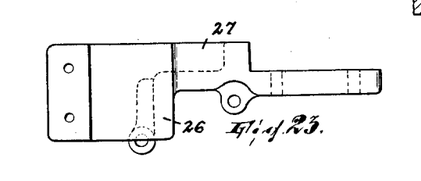

Upon the table are arranged two parallel plates $t$ and $t'$ spaced the same as in Fig. 10 to form a slot $u$ between them and over the groove $p$. The pile or stack A of sheets is imposed upon these plates, or rather upon the strips $v$ arranged thereon for the purpose of reducing the friction which would otherwise unduly retard the advance of the lowermost sheet of the stack, said pile resting against the back wall $w$ and between the abutments $x$ and $y$, the former abutment being a plate and having a slot $z$ cut in its lower edge and exposing the right-hand edges of several of the lowermost sheets in the stack. In order that the attendant may not overfill the hopper formed by plates $t$ and $t'$, back wall $w$ and abutments $x$ and $y$ an overhanging gage 2 may be arranged on the abutment $x$.

In the groove $p$ and communicating slot $u$ is arranged a longitudinally movable rack 3, said rack being provided with an underneath series of teeth 4 meshing with a toothed segment 5 which is carried by a rock-shaft 6 journaled in the bracket $s$. Said rock-shaft has a crank 7 which is connected with a crank 8 on the shaft $g$ by the pitman 9. The rack thus reciprocates once for each complete revolution of the shaft $g$. The part of the rack which directly carries the teeth for engagement with the sheets to advance the same is a strip or bar 10 narrower than the body of the rack, the left-hand end-portion 11 of which is pivotally movable on a pin 12 set in a block 13 fixed to rack 3 and forked to receive and guide the part 11; a spring 14 in the block normally holds part 11 depressed (Fig. 6) but it may rise until the lugs 11' and 11'' engage each other. The main part of the bar 10 carries the rack teeth 15; the part 11 thereof carries the rack tooth 15'. The teeth 15 serve to advance the sheet step by step; the tooth 15' serves not only to give the sheet its first impulse in such step-by-step movement but to form a bend therein with which the teeth 15 can successively engage.

The part 11 of the bar is made vertically movable for the following reason: The material intended to be operated upon is so thin, and hence so weak, that it will resist buckling only when held therefrom as by the supporting medium on the one hand and the superposed body of sheets on the other; when, as in the present case, it is unsupported in part and such part is further caused to be bent out of its normal plane (as will later appear), buckling will likely result when the advancing means acts to push the lowermost sheet from under the pile except only some yield (such as is afforded by the movable part 11) is allowed when the tooth 15' comes with a rather sudden impact against said sheet. When the tooth has advanced the said sheet as far as it can carry it the sheet is from then on wholly supported (at least from the pushing medium to the front of the stack) above and below, so that buckling under the step-by-step advance of the teeth 15 cannot result.

A strip of hardened steel 16, whose top surface is level with those of the strips $v$, is arranged on plate $t$ close behind the left-hand end of the rack, and its disposition is such, with relation to the strips $v$, that the left forward corners of the stack of sheets are unsupported and free to be drawn downwardly at the proper time to bring each within the control of the tooth 15' of the rack. This strip and a strip or bar 65 hereafter referred to also coöperates with said tooth in forming a bend in the sheet for engagement by the teeth 15 as follows: Whereas the forward edge of each tooth 15 forms a right angle with its front face, the forward edge of tooth 15' forms an angle which is acute relatively to its front face (Fig. 4). Thus as the corner of the lowermost sheet (B, Figs. 3, 4 and 7) is drawn down over strip 16 and the tail of the rack, when tooth 15' moves forward its point rides upon the edge of the sheet (rising and hence yielding slightly at the moment of initial impact) and draws the portion of said sheet edge down between strips 16 and 65, forming the bend therein.

As the movements of the rack are quick and the inertia of part 11 might cause it to rise before the tooth 15' engages the sheet, a detent 17 is secured to the table so as to overhang tooth 15', engaging said tooth and thereby holding part 11 down until after the rack is sufficiently started on its forward thrust so that the inertia of part 11 is no longer effective in the way indicated.

Figures 3, 11, 21:
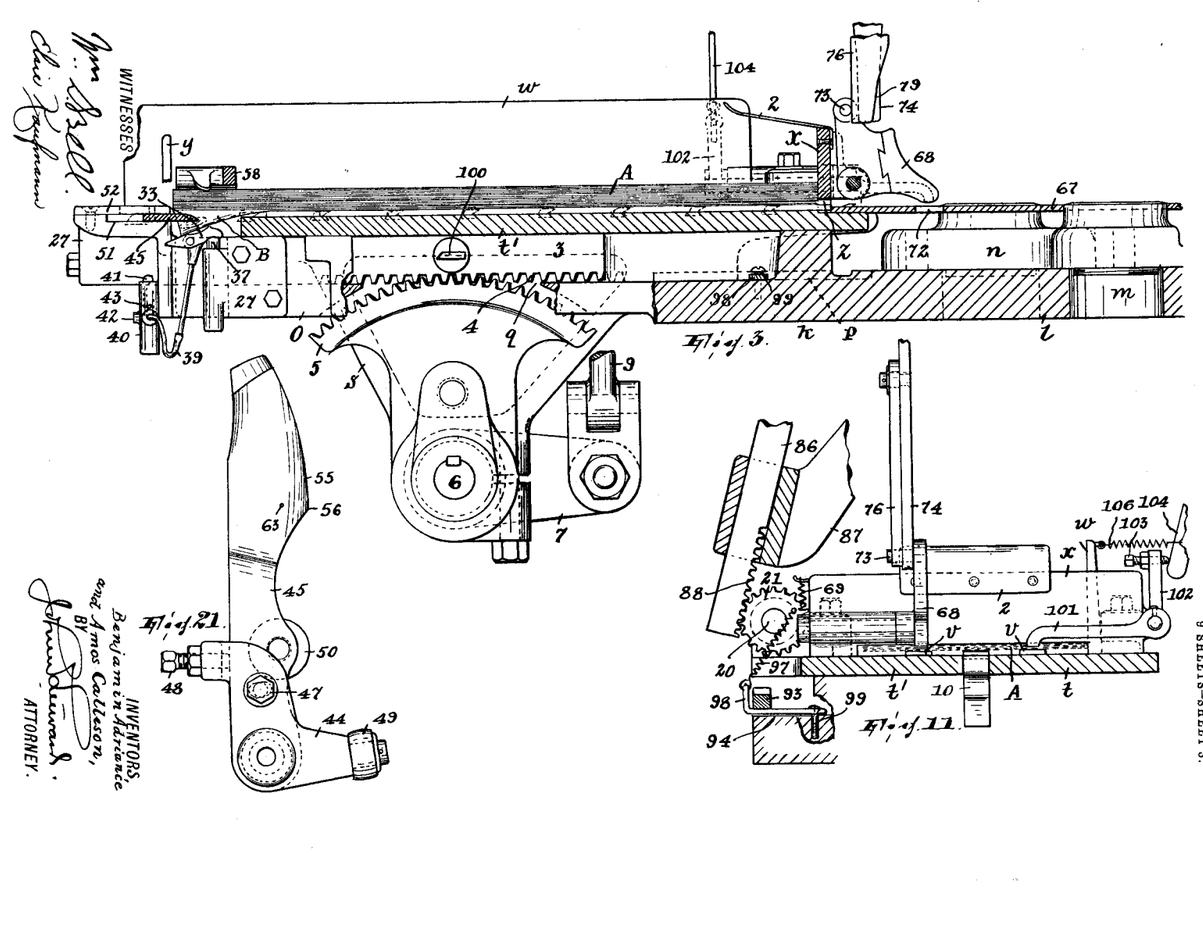
Fig. 3 a longitudinal vertical sectional view, taken in a plane slightly forward of the sheet-advancing rack, showing the hopper for the stack of sheets, parts of the means which initially act on each sheet as it is about to begin its advance, and the lower dies.
Fig. 11 is a vertical sectional view taken somewhat to the right of the hopper in Fig. 2 and looking toward the left in said figure.
Fig. 21 is a plan of the separating knife.
Figure 4:
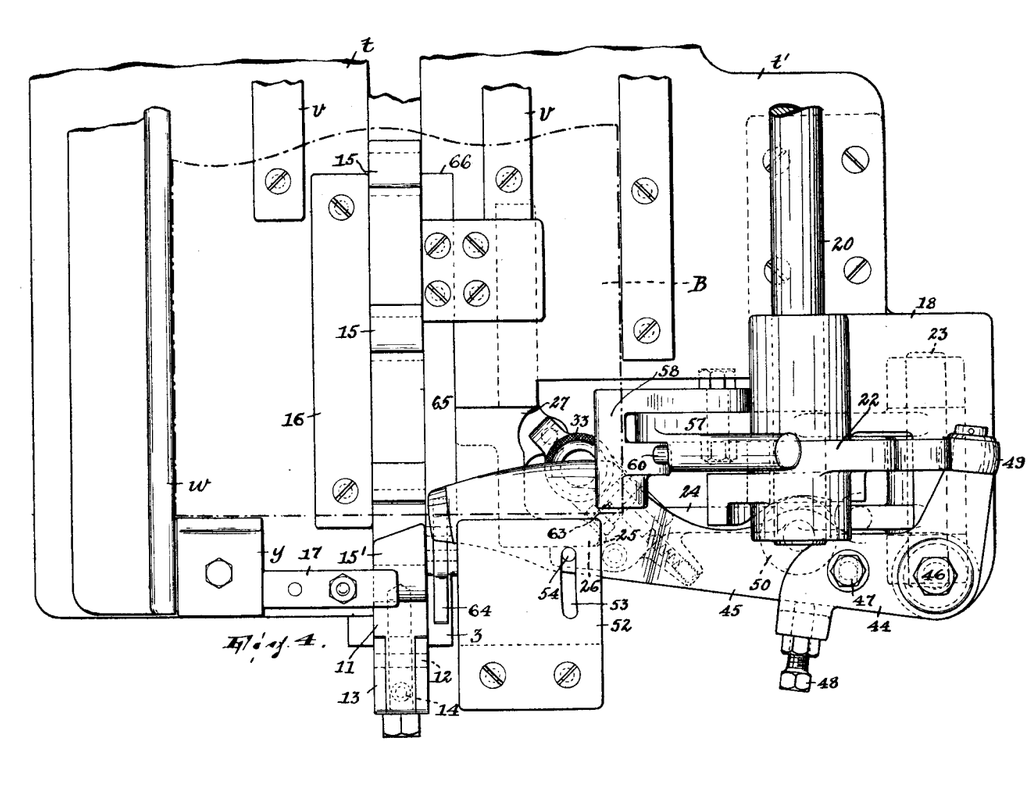
Fig. 4 is a plan view and Fig. 5 a side elevation of the left-hand end of the machine, showing the rack and the means which initially acts on each sheet as aforesaid.
Figures 5, 6, 7:
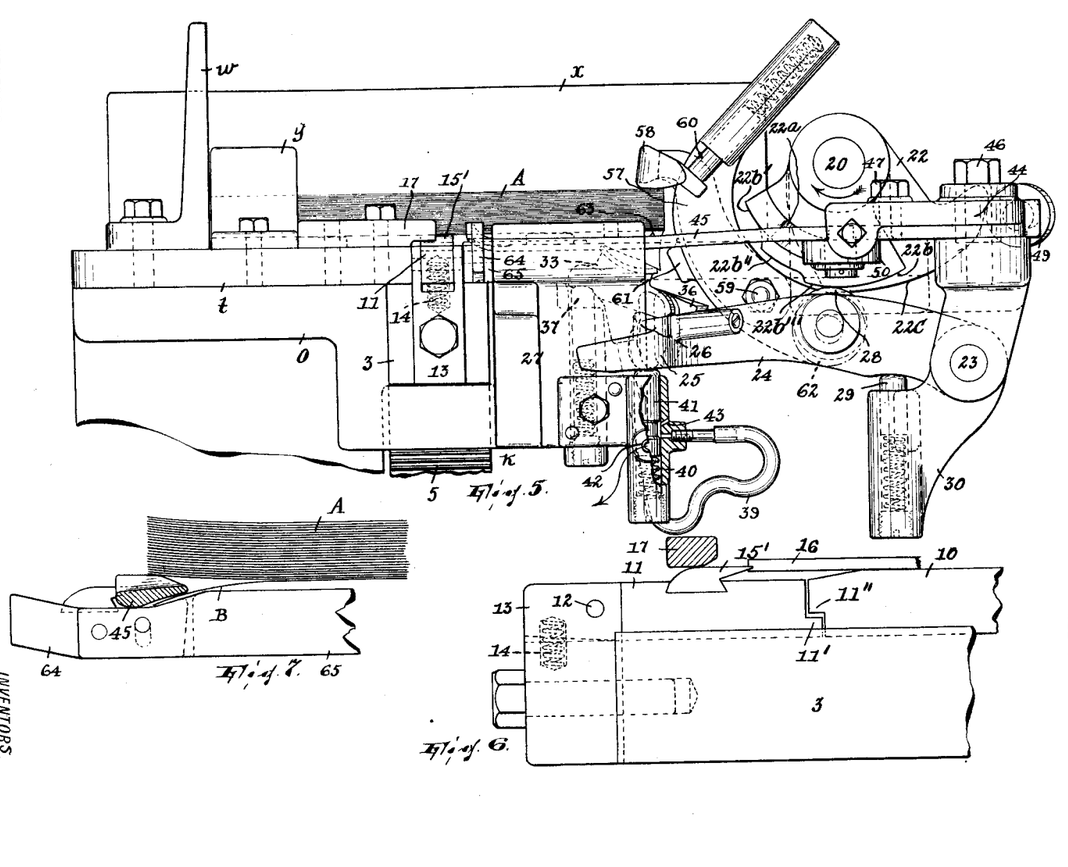
Figure 8:
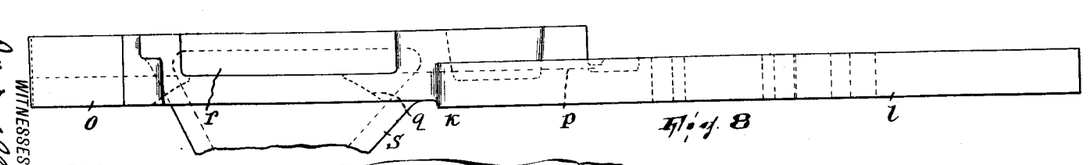
Figs. 8 and 9 are a side elevation of the table and a plan thereof and Fig. 10 a plan view of certain plates (omitted from Fig. 9) which form a part of the top of the table.
Figure 9:
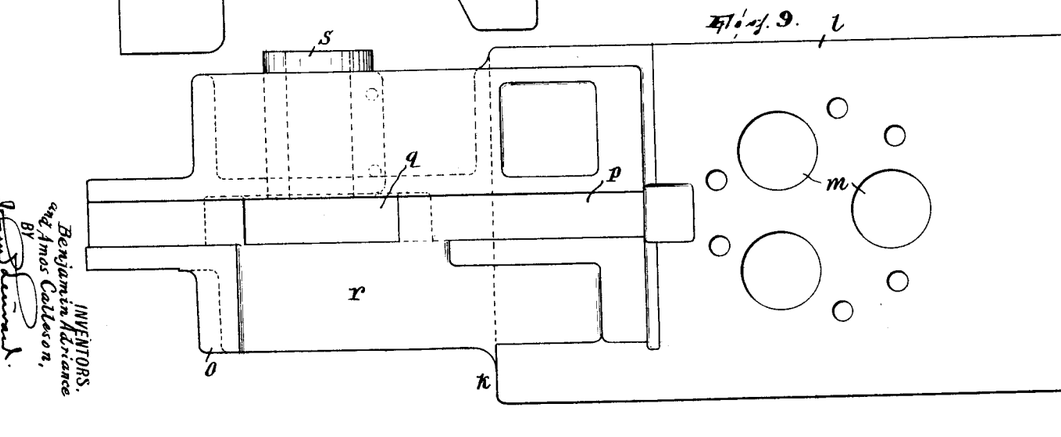

In Figs. 1, 2, 4, 5, 12, 13 and 14 is shown a bracket 18 in which and a bracket 19 arranged on the plate $t'$ is journaled a rock-shaft 20, the same being parallel with the rack 3. Endwise thrust of this shaft 20 is prevented by a pinion 21 and a cam 22 which abuts against said brackets 18 and 19. The cam 22 has a cam-way $22^a$ on the left hand face thereof, and also two peripheral cam-ways $22^b$ and $22^c$, the cam-way $22^b$ comprising three concentric portions $22^{b'}$, $22^{b''}$ and $22^{b'''}$ disposed at different distances from the center of rotation of the cam (Fig. 5). This cam, it may now be remarked, controls the mechanism whereby the left-hand forward corner (which is free to move downwardly, as already stated) of the lowermost sheet is parted from the next sheet and drawn within the control of the rack; said cam also controls the means whereby, when the lowermost sheet is being advanced, one or more of the superjacent sheets are kept from advancing with the lowermost sheet. Describing, now, these mechanisms: On a pin 23 arranged in bracket 18 parallel with and below shaft 20 is fulcrumed an arm 24 the free end of which is forked at 25 to receive the web 26 of a bracket 27 (Figs. 3, 4, 5, 22 and 23) secured to the extension $o$ of the table, said arm having a roller 28 which bears against the camway $22^b$ of cam 22 and being held against said cam by a spring actuated pin 29 arranged in a depending step 30 of the bracket 18. Referring to Figs. 4, 5, 14, 19 and 20, on a pin 31 in the end of arm 24 is pivoted a link 32 in which is in turn pivoted a suction cup 33 having as its adhesion portion a concavo-convex apertured rubber disk 34. A spring-actuated pin 35 arranged in the arm 24 tends to turn the link 32 outwardly on its pivot. Pivotal movement of the suction cup in the link in the relatively opposite direction is permitted to an extent limited by the contact of the projection 36 of said cup against the top of the arm 24 (Fig. 19). The bracket 27 houses a vertically movable spring-actuated pin 37 upon which rests the hooked outer end 38 of the suction cup 33. In order to understand the operation of the suction device which is now being described it will be assumed that the parts are in the position shown in Fig. 5. Upon cam 22 being rotated in the direction opposite to that indicated by the arrow in said figure, the roller 28 first runs from the high portion $22^{b'''}$ of the camway $22^b$ to the portion $22^{b''}$ thereof. (Previously the cam, through the arm, operated to hold the spring-actuated pin 35 retracted, projection 36 being engaged with the top of the arm 24). As the arm rises the suction cup approaches into contact or approximate contact with the lowermost sheet, spring-actuated pin 37 still operating to keep the suction cup in the tilted position it occupies as shown in Fig. 5. When the roller 28 runs from the portion $22^{b''}$ of the cam-way $22^b$ onto the still lower portion $22^{b'}$ thereof, the continued rising of the arm, combined with the contact of the suction cup on the lowermost sheet in the stack and with the action of the spring-actuated pin 35, throws the suction cup into flatwise relation to the said sheet. On the reverse movement of the cam 22, as the roller runs from $22^{b'}$ onto $22^{b''}$ thereof, the consequent depression of arm 24, with the coaction of spring-actuated pin 37, causes the suction device to tilt until its projection 36 impinges against arm 24, the effect being to peel the corner of the sheet away from the next sheet in the stack; when the roller now runs onto the portion $22^{b'''}$ of the cam, the further depression of the arm causes the suction cup to descend while still remaining tilted. It will be understood that the link 32 permits a certain flexibility of movement to the suction cup necessary in order that the latter may adapt itself somewhat to the sheet, the gripped part of which follows the arc of a circle not otherwise followed by the free end of arm 24.

It should be understood that the cam does not begin its oscillating movement from the position illustrated in Fig. 5; it begins said movement from a position where roller 28 is on cam-way $22^{b'}$, such movement following a considerable dwell, as will be seen hereafter.

The suction cup is connected by a rubber tube 39 with a valve casing 40 forming a part of the bracket 27 in which slides a spring-actuated valve 41 which in its normal or raised position affords communication from tube 39 through the casing to a port 42 to which, by suitable means, a vacuum pump or the like may be connected; when arm 24 descends to about its limit of movement it presses valve 41 downwardly until communication between the suction cup and the atmosphere is established through a port 43 in the valve casing.

Following the drawing down of the lowermost sheet by the suction device, the means comes into play which retains all the other sheets, and particularly the second lowermost sheet, from advancing with the first sheet as that is carried forward by the rack when the latter imparts its first impulse to the latter. A part of this means is a knife which, in this case, serves not only as an interposable separator but also in bending down the lowermost sheet positively into the control of the tooth 15' of the rack. This knife is shown best in Fig. 21. It comprises a bell-crank lever 44 and the knife-proper 45, both being pivoted on a vertical stud 46 on bracket 18 so as to move in horizontal planes. A slot and pin connection 47 allows adjustment of part 45 relatively to part 44 by turning a set screw 48 arranged in part 44 and engaging part 45. The parts 44 and 45 have rollers 49 and 50 respectively engaging the cam-ways 22ᶜ and 22ᵃ whereby, when the cam oscillates, the knife is oscillated. The part 45 of the knife is guided in a depression 51 of the bracket 27, a plate 52, having an arc-shaped slot 53 receiving a pin 54 on the knife, overlying part 45. The acting edge 55 of the knife is fairly sharp and from the point 56 nearly to the free end of the knife is bent downwardly so that it lies in a plane well below the top surface of strip 16, whereby, when the knife moves over the drawn-down portion of the lowermost sheet, it will assuredly force the left-hand edge of said portion upon the surface of the rack so that tooth 15' will be sure to catch the sheet on its next forward movement.

The presser (shown best in Figs. 4, 5, 17 and 18) which coacts with the knife to retain all the other sheets except the one being advanced against planiform movement during the first impulse of the rack, comprises an arm 57 fulcrumed on the pin 23 and having a foot 58 pivoted thereto at 59 so as to turn on an axis parallel with the pin 23. The member 58 bears against the top of the stack of sheets and it is cushioned in the arm 57 by means of a spring-actuated pin 60, movement of said member 58 under the action of the pin being limited by a stop 61 on the arm. The arm 57 carries a roller 62 running on the cam-way 22ᶜ of cam 22, and when the cam moves in the direction indicated by the arrow in Fig. 5 it causes the member 58 of the presser to bear against the top of the stack and thus coact with the knife to clamp or grip the stack. In order positively to prevent the lowermost one of the sheets thus gripped from being by friction drawn forward with the sheet subject to the positive advancing action of the rack, a sharp spur or pin 63 is provided on the knife, being forced into said lowermost sheet when the gripping or clamping action occurs.

It should be remarked at this point that it is only at the start of the operation of advancing a sheet that the cam 22 comes into action to move the suction device down and the gripping means into gripping relation to the stack of sheets; in other words, if it requires ten (measured by the number of the teeth of the rack) impulses of the rack to clear the lowermost sheet from the stack, during nine of those impulses the cam 22 is in its idle position, the suction device and the presser being raised and the knife retracted. After the gripping means has therefore performed the work of holding the stack while the lowermost sheet is receiving its first impulse and then goes out of action, the suction device, rising, grips the second sheet and continues the function of preventing the same from following the sheet being advanced, the suction device being adequate for this purpose inasmuch as any adhesion due to foreign substances between the sheets which might exist has by this time been overcome and no adhesion exists except what is due to friction between said sheets.

Following the withdrawal of the knife it becomes desirable to prevent the second sheet from falling into the control of the reciprocating tooth 15', prematurely. To this end, a pivoted dog 64 is arranged in the forked end of a bar 65 set in a recess 66 of the plate t'. The outer end of this dog is upwardly inclined so that when the knife moves outwardly it will rock the dog and cause its inner end to raise the tail of the second sheet out of the path of the reciprocating tooth 15'.

The rocking of shaft 20, whereby the mechanism which effects the drawing down of the sheet to be advanced is set to work, is accomplished by the sheet which last was subjected to the advancing action. To the right of the abutment $x$ and bridging the space between the strips $r$ $r$ and the raised part $k'$ of the table $k$ is a plate 67, orificed to receive the lower dies and having its top surface flush with the surfaces of said strips; the forward part of each sheet as it is advanced rests on this plate.

On the abutment $x$ is pivoted a dog whose point rests on the sheet being advanced, being so held by the spring 69. So long as a sheet is present under the dog it remains in the position shown in Fig. 3, but when the sheet is absent its spring depresses the dog so that a shoulder 70 thereon comes under a dagger 71 carried by the plunger $d$. The dagger thus turns the dog on its pivot (its point entering an orifice 72 in the plate) and thereby forces a pin 73 on the dog against a lever 74 which is turned on its pivot at 75 in the frame $b$. It is desirable to reduce the friction which the spring 69 causes the dog to otherwise impose on the sheet (with the effect of retarding the same) while retaining the dog positive and sure in its action. To this end a lever 76 hangs freely from a pivot 77 on lever 74 in the path of movement of pin 73 and when the plunger rises (that is, when a sheet is being advanced) said lever is forced, by a lug 78 on the plunger wiping over an inclined surface 79 on the lever 76, to the left, elevating the dog slightly out of contact with the advancing sheet; but when the plunger is down, said lug being then opposite the cut-away portion of the lever where its inclined surface is formed, the lever 76 permits dog 68 to respond to the action of its spring—either to impinge on the then stationary subjacent sheet or move far enough to come within the path of the dagger if the sheet is absent.

Lever 74 is held at its upper end by a spring 80 against the stem 81 of a beveled roller 82, the stem rotating freely in a shell 83 pressed toward the lever by a spring-actuated pin 84; the roller and a pin 85 in the stem abut against the ends of the shell so that the stem and shell move together longitudinally of the stem. The shell and its spring-actuated pin are housed in the upper end of a sliding rod 86 guided in a bracket 87 projecting from frame $b$, the lower end of said rod being a rack 88 engaging the teeth of the pinion 21'; this rod is pulled upwardly by a spring 86', acting to hold the roller 82 against the cam. On shaft $q$ is a cam 89 approximately one-half of which on its high part is grooved, the right hand wall of such groove being removed (at 90) at the low part of the cam. When the lever 74 is moved as above described it thrusts roller 82 to the left and as the cam 89 rotates the roller runs into the groove on the high part thereof (being thereby temporarily kept from returning to the right although it may be meanwhile released by the lever 74), the cam then acting through the roller and rod 86 to rock shaft 20.

As in our patented machine, a pawl 91 carried by a lever 92 engages the sheet which has been advanced in one of the holes formed therein by the dies to eject the sheet from the machine. In the present instance we actuate lever 92 by means of a rod 93 which rests on a ledge 94 of the table and has at its free end a hook 95 and a hump 96 adjoining and slightly higher than the hook. This rod 93 is adapted to be elevated upon the rotation of pinion 21 through the medium of a spring 97 connecting an eccentric point of said pinion with a stirrup 98 overlying the rod and held in place by a loose pin 99. From the rack 3 projects a stud 100 adapted to catch the hook 95 when the rod is raised, pulling the rod to the left and then, on the next movement of the rack to the right, forcing the rod also to the right by engaging its hump 96. By the time the rack has thus moved back and forth, shaft 20 has resumed its normal position, the rod 93 being again allowed to rest on the shelf 94 so that its hook is clear of the stud 100.

Figure 1:
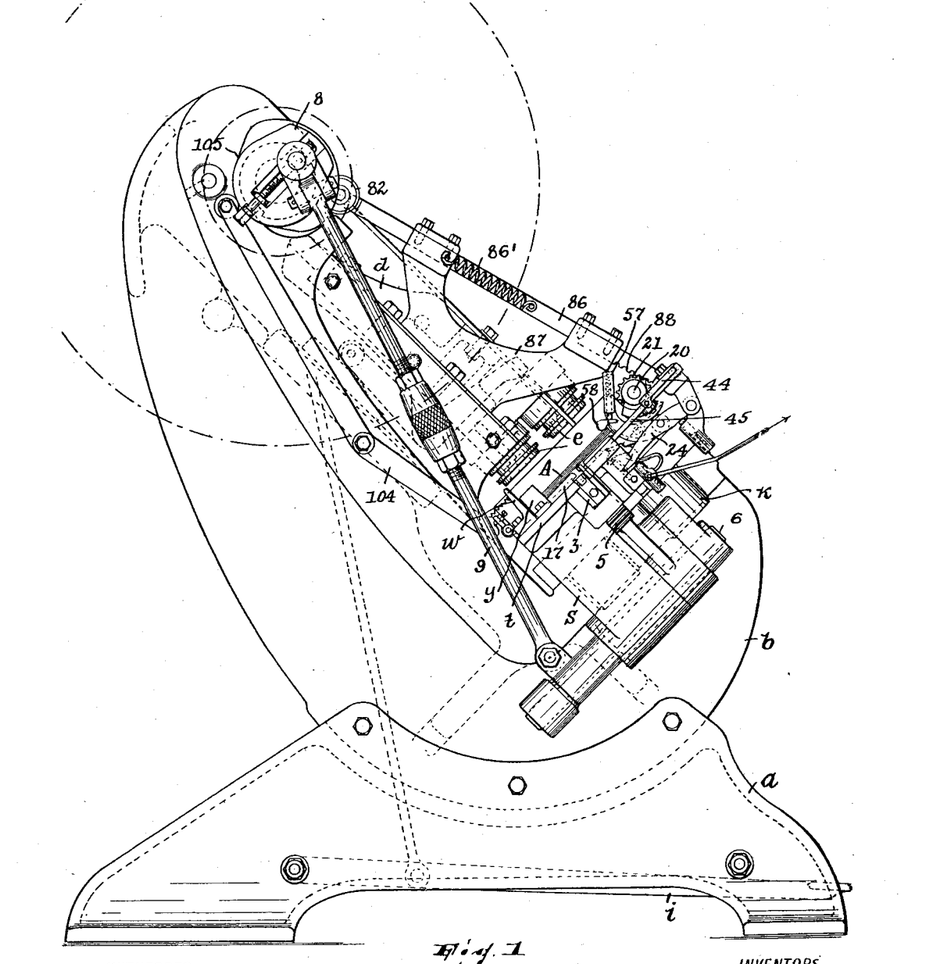
Figure 1 is a side elevation of the improved machine.
Figures 2, 2A:
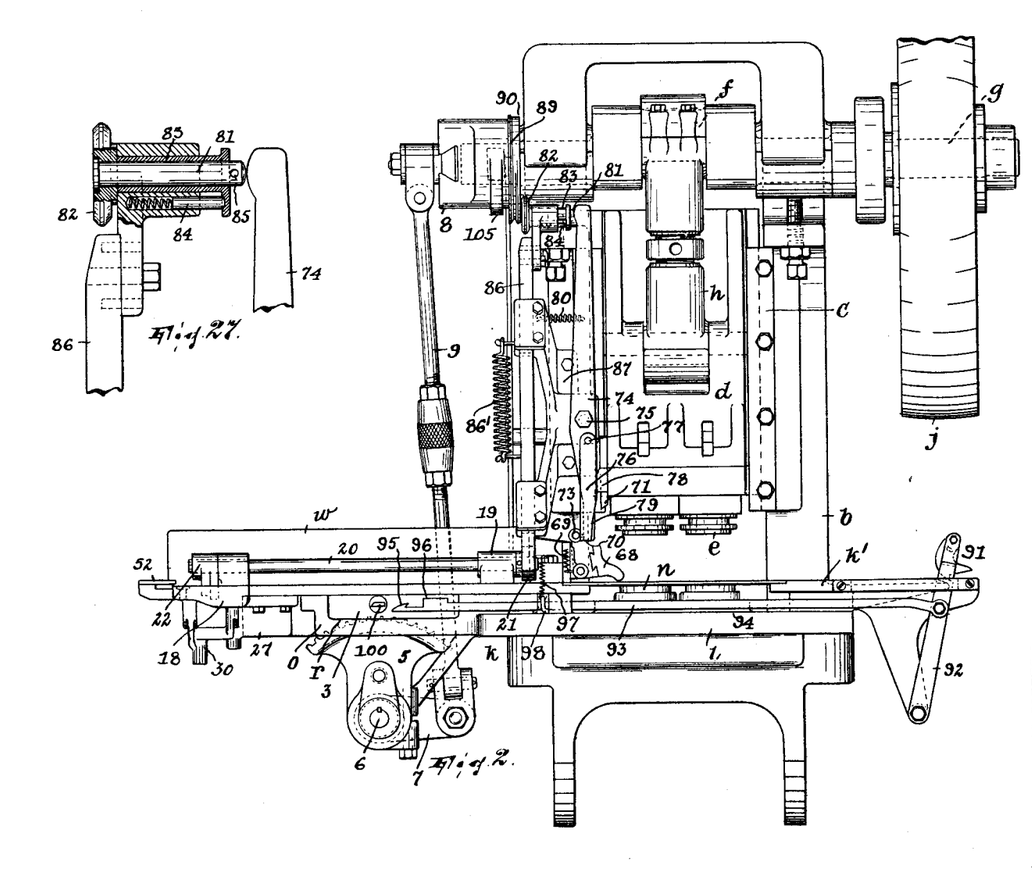
Fig. 2 a front elevation thereof.

In Figs. 1, 3 and 11 is shown means for preventing any retard (due to contact with the rack) of the sheet being advanced after each advance thereof. In Fig. 11, 101 is a presser adapted to rest on the advancing sheet and pivoted to the abutment $x$. In an arm 102 of this presser is a set screw 103 which is intermittently engaged by a lever 104, pivoted to the frame $b$ and bearing against a cam 105 on shaft $q$, whereby the presser bears down upon the advancing sheet and holds it against retard each time the rack recedes. A spiral spring 106 interposed between the lever 104 and the back wall $w$ of the hopper retains the lever normally in light contact with the sheet.

Figure 24:
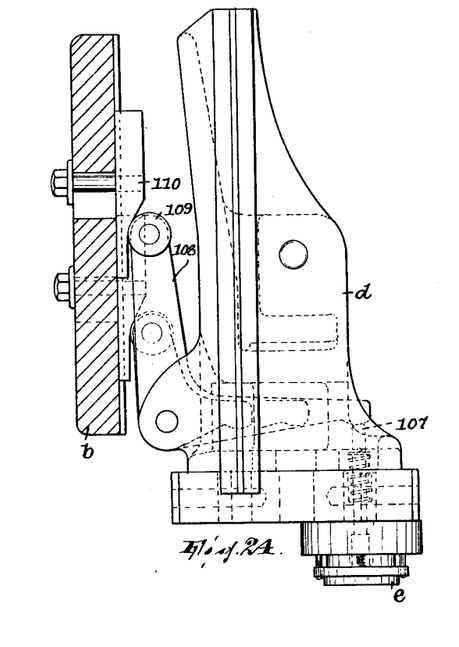
Figs. 24, 25 and 26 are side, front and underneath elevations of the die-carrier or plunger.
Figure 25:
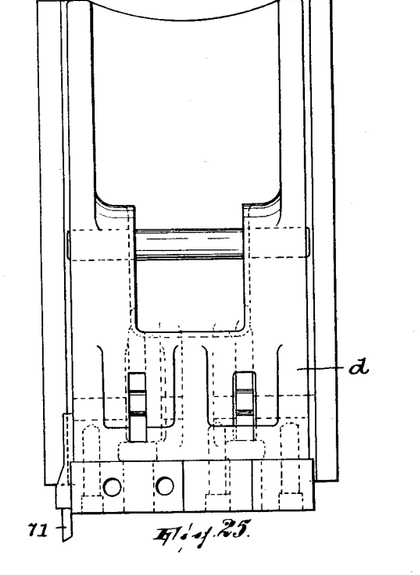
Figure 26:
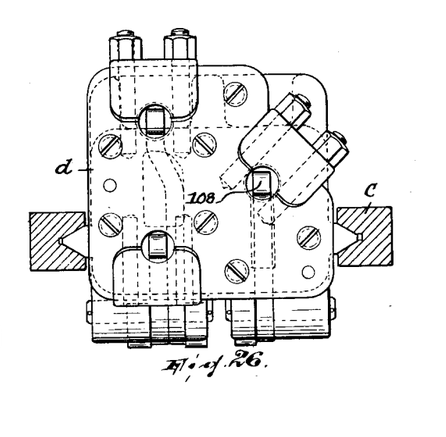

To clear the upper dies of the parts formed we provide spring-actuated ejector stems 107 upon which bear bell-crank levers 108 pivoted in the plunger $d$ and carrying rollers 109 adapted to engage fixed cams 110 on the frame $b$ (Figs. 24, 25 and 26).

Operation: A stack of sheets being placed in the hopper and shaft $g$ set rotating the rack 10 is reciprocated constantly. There being at the outset no sheet under the dog 68, when the dagger 71 descends and engages the dog, causing lever 74 to be moved, shaft 20 is rocked from cam 89 through rod 86 as already stated. (During the same cycle of rotation of shaft $g$ spring 86' returns parts 86 and 20 to their initial positions, where they remain until the sheet which now begins to advance has passed out from under the dog, whereupon they will be moved again, as before.) In the rocking of the shaft 20 the suction device and the presser have been temporarily forced downwardly and the knife temporarily interposed between the lowermost sheet and the stack of sheets, these movements being followed by the return of the parts referred to to their normal positions as soon as the cam, in rocking, moves backward. The lowermost sheet has thus had its left hand end drawn down by the suction device and knife, the latter positively separating it from the stack, so that the reciprocating rack tooth 15' on its next forward thrust will engage the left hand edge (viewing the machine as in Fig. 2) of the separated sheet and, pushing the same to the right as the first step in the advance movement of the sheet, form a bend therein (as already described) whereby the teeth 15 may successively engage the sheet to continue its step-by-step advance. Upon the interposition of the knife between the separated sheet and the stack of sheets, and while the rack is imparting the first impulse to the separated sheet, the presser coacts with the knife to clamp the stack; at this time, also, and before tooth 15' engages the sheet, the arm 24 descends far enough so that valve 41 has been sufficiently depressed to cause the vacuum in the suction cup to be vitiated, releasing the sheet so far as the suction device is concerned. The first forward impulse of the sheet being now completed, the knife, presser and suction device resume their normal positions, the last engaging and gripping the second sheet and thereby continuing to serve in retaining it against advance with the first sheet. As the separated sheet continues its advance, and following each impulse, the upper dies descend into coöperating relation to the lower dies, and, on each rise of the plunger, the ejector stems are operated, as described, to clear the upper dies of the parts cut out from the sheet. When the last impulse has been imparted to the sheet by the rack, it clears the dog 68, with the result that the next sheet is now subjected to the same operations as the first and the first sheet thrust from the machine by the ejecting mechanism.

Figure 28:
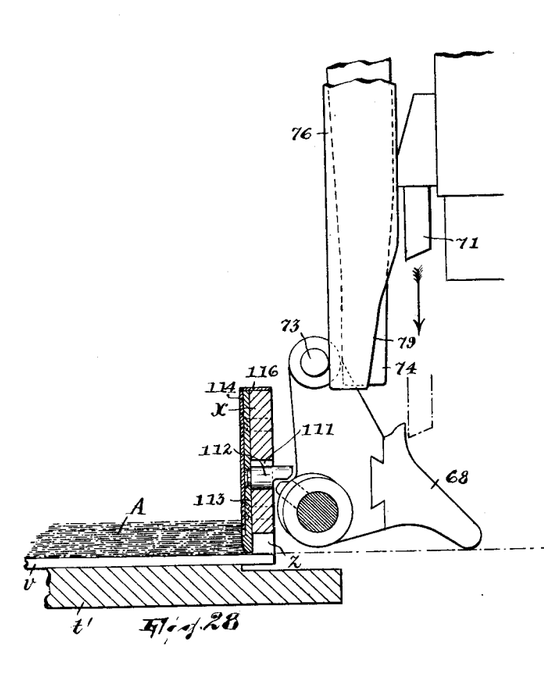
Figure 29:
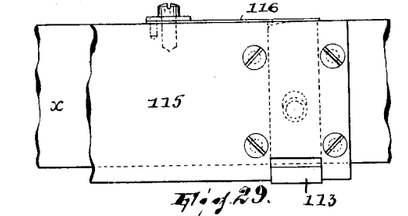
Figure 30:
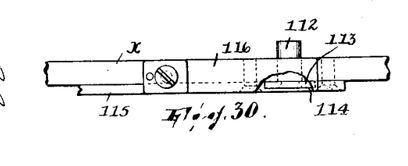

As indicated above, the presser and knife act to hold the stack against possible advancement (due to friction or adhesion) with the sheet which is at any time being advanced step by step by the rack during the first impulse of the rack, and that, during the remaining impulses, the suction device serves that function by adhering to the sheet next to that being advanced, i. e., the second sheet. Occasionally, if the grip of the suction device should happen to be inadequate, for instance, a few of the lowest sheets may work forward through opening z (which has to be sufficiently large to permit possible bends in the forward edge of any sheet to pass through it), with the result that by the time the rack has completed its advancing action on the lowest or first sheet the tail end of the third sheet would be ahead of the spur 63 of the knife, so that the knife and presser could not properly act to restrain the third sheet when the second undergoes its first advance movement, and the third might follow with the second. Ordinarily this does not happen; but it may at times, due to various causes, and in order positively to prevent it we have provided the mechanism shown in Figs. 28, 29 and 30 comprising a stop which holds back all the sheets except the one directly under the influence of the rack and movable each time a sheet is to be started on its advancing movement so that it will leave the way clear, notwithstanding a possible bend or bends in the sheet about to be advanced. This stop in the present instance is automatically moved out of the obstructing relation by the dog 68 when the same falls into the path of the dagger (owing to the absence of a sheet beneath it) and is thereby further moved to effect that part of the operation whereby a sheet is brought within the advancing influence of the rack, and it is returned to the obstructing relation by a spring; as the friction between the forward edges of the sheets and the stop might interfere with the "detecting" movement of the dog, some lost motion of the dog without engagement with the stop is allowed. Describing, now, the construction of this mechanism: Abutment x is penetrated by a slot 111, the same receiving the stud 112 of a vertically sliding stop 113. The stop moves in a guideway 114 in a facing 115 covering the inner side of the abutment and is held normally depressed by a plate spring 116 to its limit (i. e., when stud 114 engages the lower end of the slot), that is, so that it reduces the outlet afforded by opening z to be but just sufficient to allow the exit of a single sheet without undue friction. The dog may move without engaging the stud for the purpose of "detecting" the absence of a sheet beneath it; but when it does so move it comes into the path of the dagger which then moves it further, raising the stop.

Having thus fully described our invention, what we claim as new and desire to secure by Letters Patent is:

1. In a mechanism for removing sheets in sequence from a stack of sheets, the combination, with means for moving the sheet to be removed in wiping contact with an adjoining sheet, of means, having contact with that face of the latter sheet which adjoins the first-named sheet, for restraining said adjoining sheet during the moving of said first-named sheet, substantially as described.

2. In a mechanism for removing sheets in sequence from a stack of sheets, the combination, with means for moving the sheet to be removed in wiping contact with an adjoining sheet, of compression-grip means, having contact with that face of the latter sheet which adjoins the first-named sheet, for restraining said adjoining sheet during the moving of said first-named sheet, substantially as described.

3. In a mechanism for removing sheets in sequence from a stack of sheets, the combination, with means for moving the sheet to be removed in wiping contact with an adjoining sheet, of means for exerting a compression-grip on said adjoining sheet during the moving of said first-named sheet, substantially as described.

4. The combination, with means for supporting the stack of sheets, of means for removing a sheet from the stack planiform fashion, and a gripping mechanism operative to grip the tail end of the next adjoining sheet and thereby hold the latter against movement during the removal of the first sheet, substantially as described.

5. The combination, with means for supporting the stack of sheets, of means for removing a sheet from the stack planiform fashion, and a gripping mechanism operative to grip the tail end of the remaining sheets which are at one side of the first sheet and thereby hold the latter against movement during the removal of the first sheet, substantially as described.

6. In a mechanism for removing sheets in sequence from a stack of sheets, the combination, with means for moving the sheet to be removed in wiping contact with an adjoining sheet, of means for restraining said adjoining sheet during the moving of the first sheet, said restraining means being movable into and out of restraining relation to said adjoining sheet, substantially as described.

7. In a mechanism for removing sheets in sequence from a stack of sheets, the combination, with means for moving the sheet to be removed in wiping contact with an adjoining sheet, of means normally exerting a compression-grip on said adjoining sheet, and means for intermittently rendering said compression-grip means inactive, substantially as described.

8. The combination, with means for supporting the stack of sheets, of mechanism, operative on the sheets successively, for removing the sheets from the stack, and a common means for successively moving into the control of said mechanism the sheets to be removed and for thereupon restraining against movement the sheet next to that at any time being removed, substantially as described.

9. The combination, with means for supporting the stack of sheets, of mechanism for removing the sheets successively from the stack, and separate gripping members successively engageable with the sheet adjoining that at any time being removed to hold said adjoining sheet against movement, substantially as described.

10. The combination, with means for supporting the stack of sheets, of mechanism for removing the sheets successively from the stack, and separate gripping members successively engageable with the sheet adjoining that at any time being removed to hold said adjoining sheet against movement, one of said members being adapted to engage and displace the sheet about to be removed into the control of said mechanism, substantially as described.

11. The combination, with means for supporting the stack of sheets, of mechanism for removing the sheets successively from the stack, and separate gripping members successively engageable with the sheet adjoining that at any time being removed to hold said adjoining sheet against movement, the one of said members which is secondly engageable with the adjoining sheet being movable from the stack toward said mechanism to bring said sheet within the control of said mechanism, substantially as described.

12. The combination, with means for supporting the stack of sheets, of a sheet-gripping member, a sheet-removing mechanism, and means for moving said member back and forth between the stack and said mechanism to bring a sheet gripped thereby into the control of said mechanism and thereupon assume gripping relation to the next sheet in the stack, substantially as described.

13. The combination, with means for supporting the stack of sheets, of sheet gripping members engageable with the stack at one side thereof, and means for moving said members alternately into engagement with the stack, substantially as described.

14. The combination, with means for supporting the stack of sheets, of sheet-gripping members engageable with the stack at one side thereof, one of said members being movable toward and from the plane of the exposed sheet at said side of the stack, means for moving said members alternately into engagement with the stack, and means, coacting with said movable member, for removing the sheets successively from the stack, substantially as described.

15. The combination, with means for supporting the stack of sheets, of means for removing the sheets successively from the stack of sheets, and means for gripping the sheets remaining upon the removal of a sheet comprising two coacting members, one movable in a plane substantially parallel with the planes of the sheets in the stack, substantially as described.

16. The combination, with means for supporting the stack of sheets, of means for removing the sheets successively from the stack of sheets, and means for gripping the sheets remaining upon the removal of a sheet comprising two coacting members, one movable in a plane substantially parallel with the planes of the sheets in the stack and the other toward and from the first, substantially as described.

17. The combination, with means for supporting the stack of sheets, of means for removing an end sheet from the stack, mechanism operative to grip and thereby hold the next adjoining sheet against movement, and means for rendering said mechanism at first active and then inactive during the removal of the first sheet, substantially as described.

18. The combination, with means for supporting the stack of sheets, of means for effecting the removal of an end sheet in the stack comprising a sheet-gripping member, mechanism operative to grip and thereby hold the next adjoining sheet against movement, and means for rendering said mechanism at first active and then inactive during the removal of the first sheet and for moving said member into gripping relation to said adjoining sheet during the removal of said first sheet, substantially as described.

19. The combination, with means for supporting the stack of sheets, of means for effecting the removal of an end sheet in the stack comprising a sheet-gripping member, mechanism operative to grip and thereby hold the next adjoining sheet against movement, means for rendering said mechanism at first active and then inactive during the removal of the first sheet, and means for moving said member into gripping relation to said adjoining sheet during the removal of said first sheet, substantially as described.

20. The combination, with means for supporting the stack of sheets, of means for parting two adjoining sheets in the stack, means, comprising a member movable between said sheets, for establishing gripping pressure upon the part of the stack including one of said sheets, and means for moving the other of said sheets in wiping contact with the first-named sheet, substantially as described.

21. The combination, with means for supporting the stack of sheets, of means for parting two adjoining sheets in the stack comprising a member movable between said sheets, means, coacting with said member, for establishing gripping pressure upon the sheets relatively at one side of said member, and means for moving the sheet at the relatively opposite side of said member in wiping contact with the adjoining one of the gripped sheets, substantially as described.

22. The combination, with means for supporting the sheet, of means for removing said sheet planiform fashion comprising a sheet-removing member having its line of thrust substantially parallel with the plane of said sheet and having its sheet-engaging portion yieldable substantially rearwardly, substantially as described.

23. The combination, with means for supporting the sheet, of means for removing said sheet planiform fashion comprising a reciprocating sheet-removing member having its line of thrust substantially parallel with the plane of said sheet and having its sheet-engaging portion yieldable therein substantially reversely to the acting thrust of said member, and means for restraining said portion against yielding at the inception of the acting thrust of said member, substantially as described.

24. Means for forming a bend in a sheet-edge consisting of two parts one having a sheet-edge-engaging tooth and the other a sheet-edge-supporting edge disposed beside said tooth, said tooth having its acting portion undercut to overlie said sheet-edge and cut away next to the sheet-edge-supporting edge, in combination with means for moving one of said parts substantially in the direction of the length of the sheet-edge-supporting edge, substantially as described.

25. Means for forming a bend in a sheet-edge consisting of two parts one having a sheet-edge-engaging tooth disposed out of the normal plane of the sheet, and the other a sheet-edge-supporting edge disposed beside said tooth, said tooth having its acting portion undercut to overlie said sheet-edge and cut away next to the sheet-edge-supporting edge, in combination with means for moving one of said parts substantially in the direction of the length of the sheet-edge-supporting edge, and means for displacing part of the sheet into the plane of said tooth, substantially as described.

26. In combination, with means for supporting the stack of sheets, a positively holding sheet-retaining member bearing against the exposed face of one end sheet in the stack, a sheet separating means, and means for causing said member and the separating means to operate synchronously, substantially as described.

27. In combination, with means for supporting the stack of sheets, a positively holding sheet retaining member movable into and out of contact with the exposed face of one end sheet in the stack, a sheet separating means, and means for moving said member, substantially as described.

28. The combination, with means for supporting the stack of sheets, of mechanism for removing an end sheet in the stack planiform fashion, a separator interposable between said sheet and the adjoining sheet, and means for holding said adjoining sheet from movement into the control of said mechanism during the advancing of the first sheet, substantially as described.

29. In combination, with means for supporting the stack of sheets, a positively forcing sheet retaining member arranged opposite to and movable into and out of contact with the exposed face of one end sheet in the stack and a sheet separating means, substantially as described.

30. In combination, with means for supporting the stack of sheets in substantially horizontal planes, a sheet advancing mechanism arranged beneath the stack, means for positively forcing a part of the lowest sheet in the stack into the control of said mechanism, and means for retaining out of the path of said mechanism the sheet adjoining that being advanced during the advance of the latter, substantially as described.

31. The combination, with means for supporting the stack of sheets, of mechanism for effecting the successive separation of the sheets, an actuating member, means for transmitting movement from said member to said mechanism, and means, controlled by the sheets, for controlling the second-named means, substantially as described.

32. The combination, with means for supporting the stack of sheets, of mechanism for effecting the successive removal of the sheets, an actuating member, means for transmitting movement from said member to said mechanism, and means, controlled by the sheets, for controlling the second-named means, substantially as described.

33. The combination, with means for supporting the stack of sheets, of a sheet-advancing means, mechanism for moving the sheets successively from the stack into the control of the advancing means, an actuating member, means for transmitting movement from said member to said mechanism, and means, controlled by the sheets, for controlling the third-named means, substantially as described.

34. The combination, with means for supporting the stack of sheets, of means for effecting the removal of the sheets from the stack comprising a sheet separating and gripping member movable into gripping relation to the sheet adjoining that at any time being removed and means, controlled by the sheet being removed, for controlling said member, substantially as described.

35. The combination, with means for supporting the stack of sheets, of means for removing the sheets from one side of the stack successively, a sheet gripping member normally engaging said side of the stack, and means, controlled by the sheets, for intermittently rendering said member inactive to grip a sheet, substantially as described.

36. The combination, with means for supporting the stack of sheets, of means for removing the sheets from one side of the stack successively, a sheet-gripping member normally engaging said side of the stack, and means, controlled by the sheets, for intermittently moving said member away from the stack, substantially as described.

37. The combination, with means for supporting the stack of sheets, of means for effecting the removal of the sheets successively comprising a normally retracted separator interposable between sheets in the stack and means, controlled from a sheet being removed, for moving said separator into interposed relation to two sheets in the stack, substantially as described.

38. The combination, with means for feeding the material being operated upon step by step, of mechanism controlling said means and comprising a movable member normally held in the path of feed, and means for retracting said member during each advance in the feed, substantially as described.

39. The combination, with means for feeding the material being operated upon step by step and with a constantly moving part, of mechanism controlling said means, actuated from said part and comprising a movable member normally held in the path of feed and the path of movement of said part, and means for moving said member out of its normal position during each advance in the feed, substantially as described.

40. The combination, with means for feeding the material being operated upon step by step and with a constantly moving part, of mechanism controlling said means, actuated from said part and comprising a movable member normally held in the path of feed and the path of movement of said part, and means, controlled from said part, for moving said member out of its normal position during each advance in the feed, substantially as described.

41. The combination, with the supports of coacting dies, of means for feeding the material step by step between said supports, mechanism for controlling the feed comprising a movable member normally held in the path of feed, and means, actuated from the moving support, for retracting said member on each advance in the feed, substantially as described.

42. The combination, with means for supporting the stack of sheets, of means for removing the sheets from one side of the stack successively, and means, controlled from the sheet at any time being advanced, for maintaining a gripping hold on the sheet next to be advanced, substantially as described.

43. The combination, with means for supporting the stack of sheets, of means for removing the sheets from one side of the stack successively, and means, controlled from the sheet at any time being advanced, for maintaining a gripping hold on the sheet next to that being advanced, substantially as described.

44. The combination, with means for supporting the stack of sheets, of means for removing the sheets from one side of the stack successively, and gripping means, controlled from the sheet at any time being advanced and normally in gripping contact with said side of the stack, for restraining from advance the sheet next to that at any time being advanced, substantially as described.

45. In combination, with means for supporting the sheet to be operated upon, a sheet gripping device movable to and from the sheet plane and comprising a supporting member and an adhesion member movable around a pivot shiftable in the supporting member, substantially as described.

46. In combination, with means for supporting the sheet to be operated upon, a sheet gripping device movable to and from the sheet plane and comprising a supporting member, an adhesion member and a link pivotally connecting the adhesion member with the supporting member, substantially as described.

47. In combination, with means for supporting the sheet to be operated upon, a sheet gripping device movable to and from the sheet plane and comprising a supporting member, an adhesion member movable around a pivot shiftable in the supporting member and a stop engageable by the adhesion member to limit its movement from the sheet plane with the supporting member, substantially as described.

48. In combination, with means for supporting the sheet to be operated upon, a sheet gripping device movable to and from the sheet plane and comprising a supporting member and an adhesion member movable around a pivot shiftable in the supporting member, said movement in one direction being limited, substantially as described.

49. In combination, with a support for the sheet and a reciprocating part, a sheet-ejecting mechanism comprising a member having spaced projections, one extending short of and the other crossing the line of movement of said part, and means for moving said member toward said part, substantially as described.

50. In combination, with a support for the sheets and means for feeding the sheets successively comprising a reciprocating part, a sheet ejecting mechanism comprising a member having spaced projections, one extending short of and the other crossing the line of movement of said part, and means, controlled from the sheets being fed, for intermittently moving said member toward said part, substantially as described.

51. In combination, with means for advancing the sheet being operated upon, gripping means, intermittently engaging one face of the sheet, for intermittently holding the same against movement during the advancing thereof, substantially as described.

52. In combination, with means for advancing the sheet being operated upon step-by-step, gripping means, operative upon each advancing movement of the sheet and intermittently engaging one face of said sheet, for intermittently holding the same against movement during the advancing thereof, substantially as described.

53. In combination, with means for supporting a stack of sheets, means for moving a sheet of the stack relatively to the stack and planiform fashion, means for obstructing the planiform path of movement of another sheet or sheets with the first sheet, and means for moving said obstructing means out of its obstructing position, substantially as described.

54. In combination, with means for supporting a stack of sheets, means for moving a sheet of the stack relatively to the stack, means, movable into and out of the path of movement of another sheet or sheets with the first sheet, for obstructing said path, and means for actuating the second means, substantially as described.

55. In combination, with means for supporting a stack of sheets, means for successively moving the sheets thereof relatively to the stack, means, normally occupying the path of movement of another sheet or sheets with the sheet at any time being moved, for obstructing said path, and means for retracting the second means upon starting to move a sheet, substantially as described.

56. The combination, with means for supporting a stack of sheets, of a sheet-controlled means for effecting the successive movement of the sheets relatively to the stack, and means, controlled from the second means and movable into and out of the path of movement of another sheet or sheets with that at any time being moved, for obstructing said path, substantially as described.

57. In combination, with means for supporting a stack of sheets and means for moving sheets of the stack, means, controlled from a sheet being moved, for restraining other sheets in the stack against movement, substantially as described.

58. In combination, with means for supporting a stack of sheets and means for advancing a sheet of the stack planiform-fashion, means, controlled from the sheet being advanced, for restraining another sheet or sheets in the stack against advance, substantially as described.

59. In combination, with means for supporting a stack of sheets and means for advancing sheets of the stack planiform-fashion, a stop disposed in obstructing relation to a sheet or sheets adjoining one at any time being advanced and movable toward and from the plane of advance of the latter, and means for moving said stop, substantially as described.

60. In combination, with means for supporting a stack of sheets and means for advancing sheets of the stack planiform-fashion, a stop disposed in obstructing relation to a sheet or sheets adjoining one at any time being advanced, and movable toward and from the plane of advance of, and controlled by, the latter, substantially as described.

61. In combination, with means for supporting a stack of sheets and means for advancing sheets of the stack planiform-fashion, a stop disposed in obstructing relation to a sheet or sheets adjoining one at any time being advanced, and movable toward and from the plane of advance of the latter, and means, controlled from the sheet being advanced, for moving said stop, substantially as described.

In testimony, that we claim the foregoing, we have hereunto set our hands, this 22nd day of December, 1910.

BENJAMIN ADRIANCE.
AMOS CALLESON.

Witnesses:
LOUIS F. STUMPF,
TERESA MAGUIRE.

---

Copies of this patent may be obtained for five cents each, by addressing the "Commissioner of Patents, Washington, D. C."